Feb. 2, 1965 W. A. SCHOEFFLER ETAL 3,168,158
EMERGENCY RELEASE SYSTEM FOR SAFETY SEAT BELTS
Filed Feb. 20, 1963 2 Sheets-Sheet 1
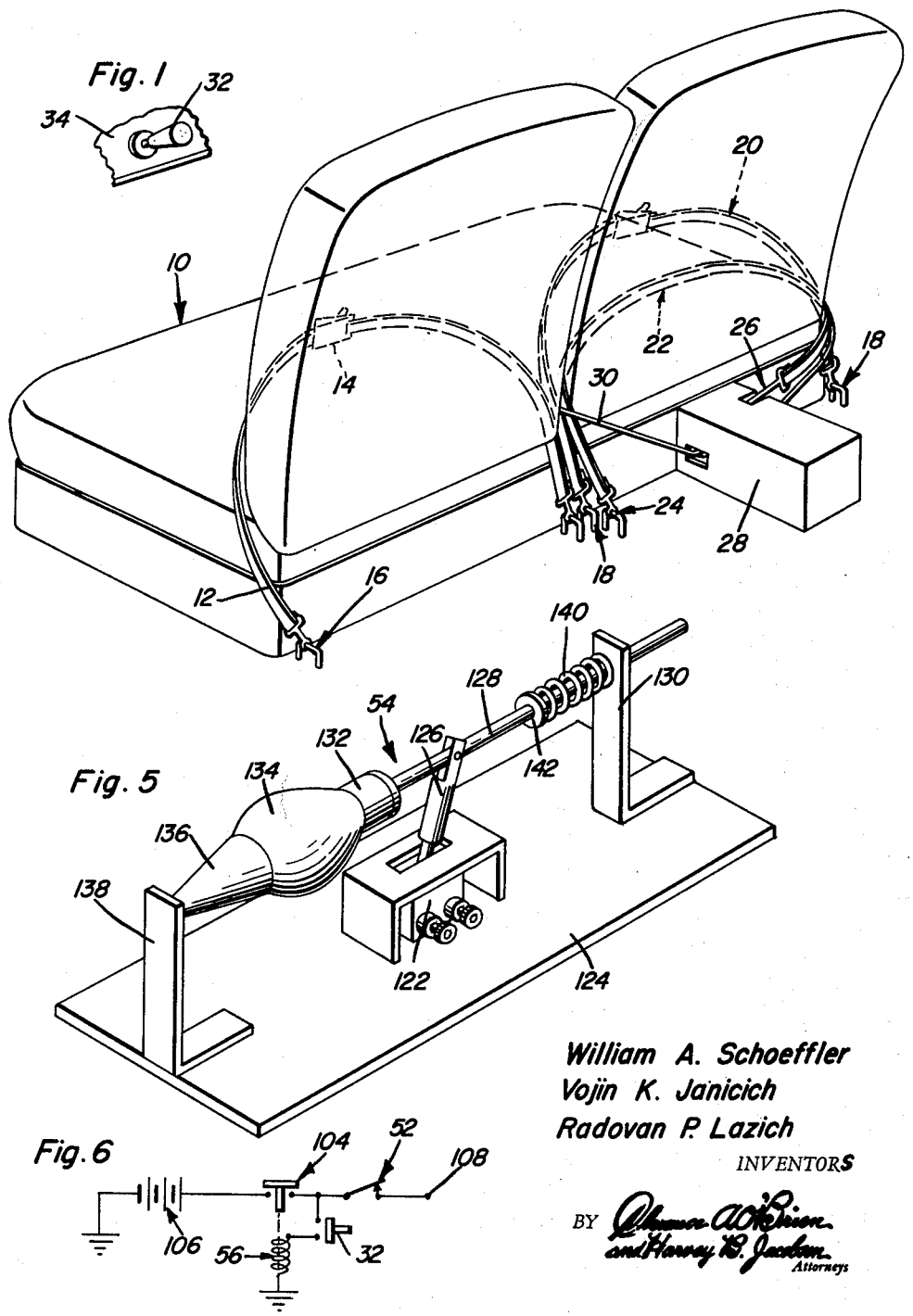
William A. Schoeffler
Vojin K. Janicich
Radovan P. Lazich
INVENTORS

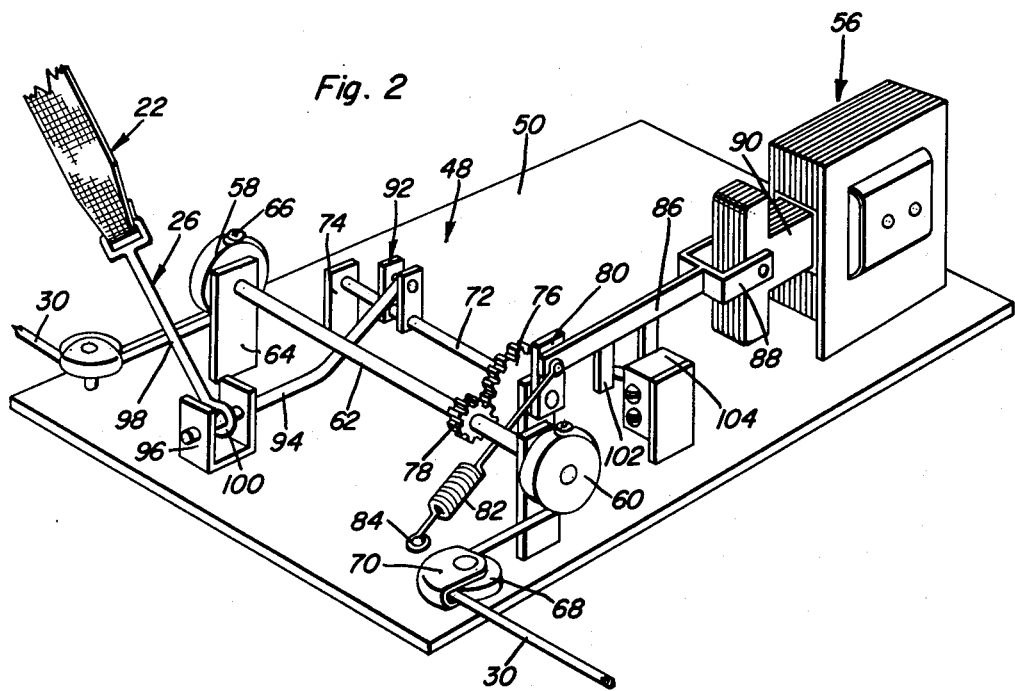
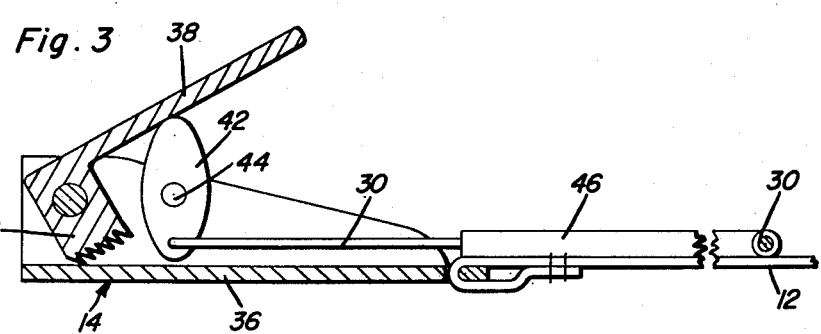
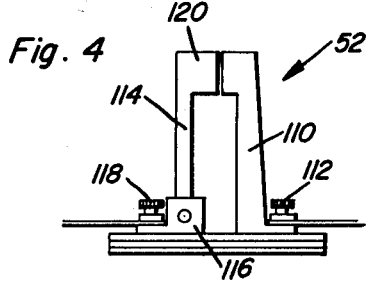
William A. Schoeffler
Vojin K. Janicich
Radovan P. Lazich
INVENTORS United States Patent Office 3,168,158
Patented Feb. 2, 1965

3,168,158
EMERGENCY RELEASE SYSTEM FOR
SAFETY SEAT BELTS
William A. Schoeffler, 4011 California Ave., Carmichael,
Calif.; and Vojin K. Janicich, 2571 23rd Ave., and
Radovan P. Lazich, 2735 Kroy Way, both of Sacramento, Calif.
Filed Feb. 20, 1963, Ser. No. 260,017
9 Claims. (Cl. 180—82)

This invention relates to a safety device and system for vehicles and in particular for automotive vehicles. The system of the present invention is related to the use of safety seat belts adapted to releasably secure the vehicle operator and passengers to their respective seats. The subject matter presented herein is therefore related to our prior co-pending application Serial No. 184,891, filed April 3, 1962, including some common features and various improvements thereover.

It is therefore a primary object of the present invention to provide a compact unit operative to release safety seat belts under emergency conditions by use of the vehicle power supply which is automatically disconnected upon release of the seat belts so as to lessen the danger of fire following emergency operation of the system with which the device is associated.

Another object of the present invention is to provide a device adapted to be fixedly mounted within a vehicle and power operated under emergency conditions for both unbuckling of permanently anchored type of seat belts and releasing the anchor of other types of seat belts particularly designed for children.

An additional object of the present invention is to provide means for disconnecting the vehicle power supply in response to impact so as to stop vehicle operation and thereby lessen the danger of fire, with the safety seat belt releasing device being independently energized by the vehicle power supply and operative when releasing the seat belts to also disconnect the power supply independently of the impact responsive device.

In accordance with the foregoing objects, an integrated safety control system is provided operative under emergency conditions to facilitate removal of passengers from the vehicle to which they may be secured by safety seat belts and to also lessen the danger of fire from the electrical power supply by disconnection thereof. The facilities for achieving the foregoing objectives are nevertheless arranged in a compact manner and easily connected to the electrical system of the vehicle.

These together with other objects and advantages which will become subsequently apparent residue in the details of construction and operation as more fully hereinafter described and claimed, reference being had to the accompanying drawings forming a part hereof, wherein like numerals refer to like parts throughout, and in which:

FIGURE 1 is a perspective view illustrating the installation of the emergency safety release system of the present invention in a vehicle.

FIGURE 2 is a perspective view of the power operator and actuating mechanism components of the present invention.

FIGURE 3 is a partial sectional view of the seat belt buckle releasing device associated with the present invention.

FIGURE 4 is a side elevational view of one form of impact responsive device associated with the system of the present invention.

FIGURE 5 is a perspective view of another form of impact responsive device associated with the system of the present invention.

FIGURE 6 is a simplified electrical circuit diagram associated with the system of the present invention.

Referring now to the drawings in detail, it will be observed from FIGURE 1, that the system of the present invention pertains to a vehicle environment including by way of example, a seat 10 adapted to seat two individuals including the vehicle operator and a passenger. The vehicle operator may therefore be secured to the seat by means of a safety seat belt which is permanently anchored, including flexible straps 12 releasably secured about the vehicle operator by a conventional type of buckle 14, the ends of the straps 12 remote from the buckle 14 being permanently anchored by any suitable anchoring facility 16 disposed rearwardly of the vehicle seat 10. Another set of permanent anchoring devices 18 are provided for a permanently anchored seat belt 20 for the vehicle passenger seated alongside of the vehicle operator. Also provided is a seat belt 22 that may be alternatively utilized for strapping a child to the seat 10, the seat belt 22 being permanently anchored at one end by the anchor device 24 and by a releasable anchoring member 26 at the other end, the releasable anchoring member 26 extending into a releasable control housing 28 from which a pair of actuating cables 30 extend for connection to each of the permanently anchored seat belts for the purpose of emergency release of the buckle devices associated therewith. An emergency control knob 32 is therefore conveniently mounted at any desired location as for example on the vehicle dashboard 34 whereby the control knob may be actuated for emergency release of both the permanently anchored seat belts through the buckle devices 14 and the releasably anchored seat belt 22 through the releasable anchoring member 26.

Referring now to FIGURES 2 and 3, it will be observed that the buckle device 14 associated with the permanently anchored seat belts includes the usual metallic buckle member 36 which pivotally mounts a locking lever member 38 having a claw tooth portion 40 adapted to grip the end portion of the belt strap 12 inserted through the buckle device. It will be appreciated of course, that other types of locking devices may be utilized in connection with the buckle device. Also mounted by the buckle member 36 for engagement with the locking lever member 38 so as to displace it to a release position under emergency conditions, is a releasing cam member 42. The cam member may therefore be angularly displaced about a pivot pin 44 by the actuating cable 30 connected to one end thereof. The actuating cable 30 is therefore slidably housed within the flexible sheathing 46 mounted on the belt strap 12 and extending from the buckle device 14 a sufficient distance so that the cable 30 may extend without binding into the control housing 28. The control housing encloses a release actuating mechanism generally referred to by reference numeral 48 which is mounted on a base 50 to which the housing 28 is secured. Also enclosed within the housing for mounting at any suitable location on the base 50 is an impact responsive device such as the device 52 illustrated in FIGURE 4 or the impact responsive device 54 as illustrated in FIGURE 5. The impact responsive device will therefore be operative to disconnect the power supply of the vehicle independently of the releasing operation of the present invention when the vehicle is subjected to a severe shock or jolt as would occur due to a collision or other vehicle accident. Release of the seat belt by actuation of the actuating mechanism 48 on the other hand, may be effected at any time by actuation of the emergency control knob 32 operative to energize a power-operated solenoid device 56 mounted on the base 50 and operatively connected to the actuating mechanism 48 for such purpose.

As more clearly seen in FIGURE 2, the actuating mechanism 48 includes a pair of pulley wheels 58 and 60 connected to opposite ends of a pulley shaft 62 rotatably mounted by spaced bracket members 64. The ends of the cables 30 are therefore anchored by fasteners 66 to the pulley members 58 and 60 for the purpose of releasing the buckle devices 14 associated with each of the permanently anchored seat belts. The cables 30 are therefore entrained about spaced guide pulleys 68 having cable retainers 70 associated therewith whereby the cables 30 may extend in the proper direction for connection to the permanently anchored seat belts without binding. A drive shaft 72 is rotatably mounted by spaced brackets 74 in parallel spaced relationship to the pulley shaft 62. A gear member 76 is therefore fixed to the drive shaft 72 and meshes with a pinion 78 on the pulley shaft 62 so that angular movement imparted to the drive shaft 72 may be transmitted at an overdrive ratio in order to effect sufficient linear displacement of the cable 30 for releasing the buckle devices 14. One end of the drive shaft 72 therefore has connected thereto a drive crank element 80 to which one end of the spring 82 is connected the other end of the spring being anchored at 84 to the base 50 so as to urge the crank element 80 to an anchoring belt position. The crank element 80 may therefore be angularly displaced against the bias of the spring 82 to a belt release position by means of the link member 86 pivotally connected to the crank element and having a clevis portion 88 pivotally connected to the armature 90 of the power-operated solenoid device 56. It will therefore be apparent, that upon energization of the solenoid device 56, the armature 90 thereof will longitudinally displace the link element 86 in order to angularly displace the drive shaft 72 and the pulley shaft 62 through the gearing 76 and 78. A driven crank assembly 92 is also connected to the drive shaft 72 for pivotal connection to a releasable anchoring rod member 94 an end portion of which is slidably received within the bracket 96 secured to the base 50. Accordingly, the anchoring member 26 includes an elongated shank portion 98 one end of which is secured to the belt 22 the other end being provided with an eye 100 through which the releasable anchoring rod 94 extends. Accordingly, displacement of the link element 86 by the solenoid 56 will be operative to displace the rod 94 a sufficient distance for withdrawal from the bracket 96 in order to release the releasable anchoring member 26 while at the same time linear displacement of the cables 30 is effected all against the bias of the spring 82. When such displacement of the link element 86 occurs, the projection 102 thereon is operative to actuate a power-disabling switch 104 also mounted on the base 50. Accordingly, the switch 104, the solenoid device 56 and the switch with which the control knob 32 is associated, are electrically connected to the power supply of the vehicle.

Referring to FIGURE 6 in particular, it will be observed that the vehicle power supply is diagrammatically illustrated and referred to by reference numeral 106. The power supply is therefore connected to the vehicle ignition terminal 108 for operation of the vehicle through the normally closed disabling switch 104 and the normally closed contacts of the impact-responsive device 52 in series with the switch 104. Accordingly, opening of either switch 104 or the switch associated with the impact-responsive device 52, will disconnect the power supply in order to disable vehicle operation and thereby lessen the danger of fire. Also connected to the power supply 106 for energization independently of the switch of the impact-responsive device 52, is the solenoid device 56. The solenoid device 56 is however connected to the power source through the emergency control switch 32. It will therefore be apparent, that upon closing of the control switch 32, the solenoid device 56 will be energized regardless of the condition of the impact-responsive device 52 and when so energized, will disconnect the power supply therefrom.

As more clearly seen in FIGURE 4, the impact-responsive device 52 includes a fixed contact member 110 with which the terminal post 112 is associated for connection to an electrical conductor. A movable contact member 114 is pivotally mounted by portion 116 of the device 52 and is electrically connected to an electrical conductor by the terminal post 118. The movable contact member 114 is normally in electrical contact with the fixed contact member 110 so held by any suitable means such as a spring or magnetic means and has at the end remote from the mounting portion 116, an inertia mass portion 120 adapted to cause displacement of the movable contact member away from the fixed contact member 110 when the vehicle is subjected to accelerating or decelerating force of a magnitude usually associated with collision or unintentionally abrupt stoppage. Disconnection of the power supply without effecting operation of the solenoid device 56 will therefore occur as hereinbefore indicated with respect to FIGURE 6. FIGURE 5 illustrates another form of impact-responsive device 54 wherein a switch device 122 is fixedly mounted on a base 124 for connection into the electrical circuit as described with respect to the switch device 52 in FIGURE 6. Associated with the switch device 122, is an actuator lever 126 which is connected to an actuator rod 128 slidably mounted by the bracket 130 fixed adjacent one end of the base 124. The other end of the actuator rod 128 is connected to the base 132 of a glass bulb 134 or other relatively brittle material. The glass bulb 134 therefore abuts against a holding element 136 fixed to the bracket 138 fixedly mounted on the base 124 at an end opposite the bracket 130. The holding element 136 will therefore be operative through the glass bulb 134 to hold the actuating rod in a closed switch position against the bias of a spring 140 which reacts between the bracket 130 and a washer 142 fixed to the actuating rod. It will therefore be apparent, that any severe impact or shock to which the vehicle is subjected, would cause breakage of the glass bulb 132 whereupon the actuating rod 128 will be forced by the spring 140 toward a switch opening position. Disconnection of the power supply for disabling vehicle operation will therefore occur as a result. The impact-responsive device whether it is device 52 or device 54 may be fixedly mounted in the vehicle at any desired location so as to properly respond to impact and may if desired be mounted within the housing 28.

From the foregoing description, the operation, construction and utility of the system and components of the present invention will be apparent. It will therefore be appreciated, that the emergency release system of the present invention will be suitable for emergency release of safety seat belts for both adults and children. Also, it will be apparent that the releasing control system may operate in conjunction with an impact-responsive device disabling vehicle operation without being affected by opening of the impact-responsive switch yet being operative to alternatively disable the electrical circuit for vehicle operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An emergency safety system for a vehicle having seat belts and a power supply for vehicle operation, comprising, release means operatively connected to each of said seat belts, actuating mechanism fixedly mounted in the vehicle and operatively connected to said release means for unbuckling the seat belts, power operated means operatively connected to the actuating mechanism for actuation thereof when energized by said power supply, emergency control means selectively connecting said power supply to the power operated means for energization thereof, and means responsive to actuation of the actuating mechanism for disconnecting the power supply to disable vehicle operation.

2. The combination of claim 1, wherein said release means comprises, buckle releasing cam means mounted on the seat belts, flexible cable means connecting the cam means to the actuating mechanism, said actuating mechanism comprising pulley means to which said cable means in anchored, crank means biased to an anchoring position, link means connected to said crank means and the power operated means for displacement of the crank means against the bias thereon to a release position, and gear means drivingly connecting the crank means to the pulley means for actuating the cable means, said means responsive to actuation of the actuating mechanism comprising a switch engaged by the link means when displaced by the power operated means.

3. An emergency safety system for a vehicle having seat belts and a power supply for vehicle operation, comprising, release means operatively connected to each of said seat belts, actuating mechanism fixedly mounted in the vehicle and operatively connected to said release means for releasably anchoring at least one of the seat belts, power operated means operatively connected to the actuating mechanism for actuation thereof when energized by said power supply, emergency control means selectively connecting said power supply to the power operated means for energization thereof, and means responsive to actuation of the actuating mechanism for disconnecting the power supply to disable vehicle operation.

4. The combination of claim 3, wherein said release means includes an elongated anchoring member, said actuating mechanism including, releasing rod means slidably mounted for engaging said elongated anchoring member, crank means connected to said releasing rod means and biased to an anchoring position, link means connected to said crank means and the power operated means for displacement of the crank means against the bias thereon to a release position, and said means responsive to actuation of the actuating mechanism comprising a switch engaged by the link means when displaced by the power operated means.

5. An emergency safety system for a vehicle having permanently anchored and releasably anchored seat belts and a power supply for vehicle operation comprising, release means operatively connected to each of said seat belts, actuating mechanism fixedly mounted in the vehicle and operatively connected to said release means for unbuckling a permanently anchored seat belt and releasably anchoring a releasably anchored seat belt, power operated means operatively connected to the actuating mechanism for actuation thereof when energized by said power supply, emergency control means selectively connecting said power supply to the power operated means for energization thereof, and means responsive to actuation of the actuating mechanism for disconnecting the power supply to disable vehicle operation.

6. The combination of claim 5, wherein said release means comprises, buckle releasing cam means mounted on the permanently anchored seat belts, flexible cable means connecting the cam means to the actuating mechanism, and an elongated anchoring member connected to one end of the releasably anchored seat belt releasably secured to the actuating mechanism.

7. The combination of claim 6, wherein said actuating mechanism comprises, pulley means to which said flexible cable means is anchored, releasing rod means slidably mounted for engaging said elongated anchoring member, crank means connected to said releasing rod means and biased to an anchoring position, link means connected to said crank means and the power operated means for displacement of the crank means against the bias thereon to a release position, and gear means drivingly connecting the crank means to the pulley means for actuating the cable means, said means responsive to actuation of the actuating mechanism comprising a switch engaged by the link means when displaced by the power operated means.

8. The combination of claim 5, wherein said actuating mechanism comprises, pulley means to which said flexible cable means is anchored, releasing rod means slidably mounted for engaging said elongated anchoring member, crank means connected to said releasing rod means and biased to an anchoring position, link means connected to said crank means and the power operated means for displacement of the crank means against the bias thereon to a release position, and gear means drivingly connecting the crank means to the pulley means for actuating the cable means, said means responsive to actuation of the actuating mechanism comprising a switch engaged by the link means when displaced by the power operated means.

9. In combination with a vehicle having a power supply and a plurality of seat belts, permanent anchor means for anchoring opposite ends of at least one seat belt having two sections interconnected by a releasable buckle mechanism, another of said belts being formed from a single section having one end permanently anchored and an opposite end releasably anchored, and power operated means mounted in the vehicle adjacent the anchored ends of said seat belts for simultaneously releasing said buckle mechanism and the releasably anchored end of the other seat belt when energized by the power supply.

References Cited by the Examiner
UNITED STATES PATENTS

| | | |
|---|---|---|
| 2,223,097 | 11/40 | Ehret. |
| 2,240,085 | 4/41 | Wells _____ 180—82 X |
| 2,754,073 | 7/56 | Holm et al. |
| 2,868,309 | 1/59 | Burgess _____ 180—82 |
| 2,883,123 | 4/59 | Finnigan _____ 280—150 X |

PHILIP ARNOLD, *Primary Examiner.*

A. HARRY LEVY, *Examiner.*